(12) United States Patent
Qiao et al.

(10) Patent No.: US 7,523,344 B2
(45) Date of Patent: Apr. 21, 2009

(54) METHOD AND APPARATUS FOR FACILITATING PROCESS MIGRATION

(75) Inventors: Donghai Qiao, Reading, MA (US); Sanjeev M. Bagewadi, Bangalore (IN); Pramod Batni, Bangalore (IN)

(73) Assignee: Sun Microsystems, Inc., Santa Clara, CA (US)

( * ) Notice: Subject to any disclaimer, the term of this patent is extended or adjusted under 35 U.S.C. 154(b) by 488 days.

(21) Appl. No.: 11/471,351

(22) Filed: Jun. 19, 2006

(65) Prior Publication Data

US 2007/0294578 A1 Dec. 20, 2007

(51) Int. Cl.
*G06F 11/00* (2006.01)
(52) U.S. Cl. ............................................ 714/6; 714/15
(58) Field of Classification Search .................. 714/10, 714/11, 4, 6, 15
See application file for complete search history.

(56) References Cited

U.S. PATENT DOCUMENTS

| | | | | |
|---|---|---|---|---|
| 5,828,569 | A * | 10/1998 | Fisher | 700/82 |
| 7,146,529 | B2 * | 12/2006 | Aguilar et al. | 714/10 |
| 7,411,925 | B2 * | 8/2008 | Nain et al. | 370/329 |
| 2006/0085679 | A1 * | 4/2006 | Neary et al. | 714/13 |
| 2006/0112297 | A1 * | 5/2006 | Davidson | 714/2 |
| 2007/0239854 | A1 * | 10/2007 | Janakiraman et al. | 709/218 |
| 2007/0245334 | A1 * | 10/2007 | Nieh et al. | 717/168 |
| 2008/0104441 | A1 * | 5/2008 | Rao et al. | 714/3 |
| 2008/0115010 | A1 * | 5/2008 | Rothman et al. | 714/10 |
| 2008/0216089 | A1 * | 9/2008 | Jia et al. | 719/312 |
| 2008/0295111 | A1 * | 11/2008 | Craft et al. | 719/313 |

OTHER PUBLICATIONS

Publication: Authors: Michael Litzkow, Todd Tannenbaum, Jim Basney, and Miron Livny, entitled "*Checkpoint and migration of UNIX processes in the Condor distributed processing system*", Technical Report UW-CS-TR-1346, University of Wisconsin—Madison Computer Sciences Department, Apr. 1997.

\* cited by examiner

*Primary Examiner*—Marc Duncan
(74) *Attorney, Agent, or Firm*—Park, Vaughan & Fleming LLP (57) ABSTRACT

A system that migrates a process from a source computer system to a target computer system. During operation, the system generates a checkpoint for the process on the source computer system, wherein the checkpoint includes a kernel state for the process. Next, the system swaps out dirty pages of a user context for the process to a storage device which is accessible by both the source computer system and the target computer system and transfers the checkpoint to the target computer system. The system then loads the kernel state contained in the checkpoint into a skeleton process on the target computer system. Next, the system swaps in portions of the user context for the process from the storage device to the target computer system and resumes execution of the process on the target computer system.

20 Claims, 9 Drawing Sheets

```
workset {
    // architecture
    cpu_arch
    Solaris_version
    kernel_patch
    kernel_32_64

// configurations, to meet the minimum requirement
    mini_CPUs
    mini_swap
    mini_stacksize
    mini_semmni
    mini_semmns
    mini_semmsl
    mini_semmap
    mini_semume
    mini_semmnu
    mini_shmmax
    mini_shmmin
    mini_shmmni
    mini_shmseg
    mini_msgssz
    mini_msgmap
    mini_msgseg
    mini_pt_cnt // file system
    mini_filesize mini_datasize
    mini_descriptors // network configuration, e.g.
    netmask = 255.255.255.0
    logical_host = 129.148.174.1

// working directories, e.g.
    /tmp/...
    /oracle/user/...
    /home/joe/usr/.lock
    /app/bin/appserver // working environemnt
    user_name
    group_name
    priority
}
```

FIG. 1A

```
if (curproc→p_stat & MIGRATE_STEP1)
then
    try to get the lock;
    if failed then
        restore all the state that has been modified;
        set the user pc register to the entry of this system call;
        thread→t_state |= MIGRATE_STEP1;
        put this thread in the migration queue MQ;
        wakeup_the_checkpointing_thread();
        return;
    else
        /* the original code here */
        ...
    endif
endif
```

FIG. 1B

```
checkpointing_thread(pid)
    {
        ...
        /* find the process P we want to checkpoint it; */
        P = checkpoint_process(pid);
        P→p_stat |= MIGRATE_STEP1;
        do {
            thread_blocked = 0;
            for any thread of P
            {
                if thread is in user mode
                then
                        /* indicate this thread will be migrated */
                        thread→t_state |= MIGRATE_STEP1;
                        put thread in migration queue MQ;
                else
                        if thread is in the sleep queue
                        then
                                thread_blocked++;
                        endif
                endif
            } if thread_blocked == 0
            then
                    P→p_stat |= MIGRATE_STEP2;
                    return checkpoint_done;
            else
                    /* dequeue one of the thread from MQ, and put
                      it to a proper dispatch queue according to
                      it's priority
                    */
                    thread = get_thread_from_MQ();
                    thread→t_state &= ~MIGRATE_STEP1;
                    put_thread_to_dispatch_queue(thread);

/* Now the checkpointing thread has go to the sleep queue */
                    yield the cpu and go to the sleep queue;
                endif
            while ( thread_blocked > 0 )
            ....
    }
```

METHOD AND APPARATUS FOR FACILITATING PROCESS MIGRATION

RELATED APPLICATION

This application hereby claims priority under 35 U.S.C. §119 to Indian Patent Application No. 421/KOL/2006, filed on 8 May. 2006, entitled "Method and Apparatus For Facilitating Process Migration", by inventors Donghai Qiao, Sanjeev Bagewadi, and Pramod Batni.

BACKGROUND

1. Field of the Invention

The present invention relates to techniques for managing processes in computer systems. More specifically, the present invention relates to a method and apparatus for migrating a running process from a source computer system to a target computer system.

2. Related Art

When a computer system within a high-availability computing cluster fails, a redundant computer system can be used to replace the failed computer system. This process of replacing a failed computer system with a redundant computer system is referred to as a "failover" operation. Unfortunately, two problems arise during failover operations: (1) temporary service unavailability, and (2) the long time required for a failover operation. Note that the failover time generally includes three components: (1) file systems synchronization time, (2) cluster framework operation time, and (3) data service shutdown and restart time.

Some mission-critical applications, such as financial and banking applications, require a short recovery time after a computer system fails and also require transparent service resumption/migration, so that transactions can be processed consistently without being interrupted. These types of applications are typically executed on by traditional fault-tolerant computer systems.

Unfortunately, existing UNIX kernels provide no kernel service to generate a checkpoint for a running process and to resume it when needed. Due to this lack of operating system support, fault-tolerant computer systems (e.g., using cluster technology) need to restart a data service when a failover operation occurs. Thus, the original service needs to be shutdown on the source computer system and a new service needs to be started on a target computer system which replaces the source computer system. As a result, when the service is resumed on the target computer system, the target computer system has to reestablish all network-connections to the clients which were established before the failover. As a consequence, although the failover of a logical host is transparent to the client (i.e., the replacement host uses the same IP address as the host that failed), the failover of a data service is not transparent to the client.

One solution to these problems is to provide an efficient mechanism to migrate a process from a source computer system to a target computer system. Process-migration mechanisms typically fall into two categories: (1) heterogeneous process-migration mechanisms and (2) homogeneous process-migration mechanisms. Heterogeneous process-migration mechanisms provide the ability to migrate an active process between computer systems with different architectures (e.g., SPARC® to Intel®). This technique requires a special operating system, and special programming language support. Homogeneous process-migration mechanisms can migrate a process between two systems that have the same architecture (i.e., SPARC® to SPARC®) and the same system configuration.

Several techniques have been developed to support process migration, but most of these projects are aimed at migrating a process at high level, instead of migrating a process along with its kernel states. The biggest obstacle to migrating a process along with its kernel state is the lack of operating system support to gather this kernel state. Consequently, no effort has been made to try to migrate the network kernel state for a live process. In addition to this problem, many existing techniques require the user applications to be recompiled.

Hence, what is needed is a method and an apparatus for migrating a process without the problems described above.

SUMMARY

One embodiment of the present invention provides a system that migrates a process from a source computer system to a target computer system. During operation, the system generates a checkpoint for the process on the source computer system, wherein the checkpoint includes a kernel state for the process. Next, the system swaps out dirty pages of a user context for the process to a storage device which is accessible by both the source computer system and the target computer system and transfers the checkpoint to the target computer system. The system then loads the kernel state contained in the checkpoint into a skeleton process on the target computer system. Next, the system swaps in portions of the user context for the process from the storage device to the target computer system and resumes execution of the process on the target computer system.

In a variation on this embodiment, while generating the checkpoint for the process on the source computer system, for each thread in the process, the system determines if the thread is in a user mode. If so, the system places the thread into a thread-migration queue. After all threads for the process are in the thread-migration queue, the system synchronizes associated file systems. After the associated file systems have been synchronized, the system places the process into a process-migration queue.

In a further variation, while synchronizing associated file systems, the system completes pending I/O operations and writes back cached data to associated file systems.

In a further variation, the kernel state for the process can include a process structure state, a user-structure state, an address-space state, a spawned threads structure state, a lightweight-processes structure state, an inter-process-communication state; a list of opened files state, and a network-connections state.

In a variation on this embodiment, while generating the checkpoint for the process on the source computer system, the system encapsulates the kernel state for the process.

In a variation on this embodiment, prior to swapping in portions of the user context for the process from the storage device to the target computer system, the system enables inbound packets to the process on the target computer system.

In a variation on this embodiment, prior to loading the kernel state contained in the checkpoint into the skeleton process on the target computer system, the system spawns the skeleton process, which involves considering information on the number of threads to be spawned for the process, the number of files to be opened for the process, and the number of network-connections to be established for the process.

In a variation on this embodiment, while transferring the checkpoint to the target computer system, the system first transfers the checkpoint to an intermediate storage device, and at a later time, the system transfers the checkpoint from the intermediate storage device to the target computer system.

In a variation on this embodiment, prior to generating the checkpoint for the process on the source computer system, the system registers the process with a global process scheduling framework. Next, the system receives an indication that the process is to be migrated, wherein the indication can include a request by an authorized user, a system failure event, an online load balancing event, or online system maintenance event. The system then disables inbound network packets directed to the process, and processes network packets already in a network queue for the source computer system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Overview

One embodiment of the present invention provides a kernel service for migrating a process. This kernel service provides seamless process migration wherein the kernel state for the process is encapsulated, and the whole user context for the process is swapped out to a storage device. In one embodiment of the present invention, the target computer system has access to the storage device. In this embodiment, the failover is completely transparent to client side because the network kernel stack is resumed as well. More specifically, all of the modified pages are swapped out to the shared storage device, thereby reducing the time to migrate a process.

One embodiment of the present invention provides online load balancing which improves system response time and reduces network traffic.

One embodiment of the present invention provides online system maintenance, thereby facilitating network reconfiguration, service deployment, physical relocation, hardware maintenance, and software maintenance.

Some scientific application may take a long time to finish on a computer system. In these applications, it is often useful to save the state of the application to a storage device and to resume execution of the application at a later time. Hence, one embodiment of the present invention provides checkpoint and resume functionality to checkpoint a process and resume it at a later time.

One embodiment of the present invention provides a mechanism which facilitates making a computing system fault-tolerant. Note that fault-tolerant systems and high-availability clusters are two different approaches to providing fault-tolerance. Fault-tolerant systems provide continuous service when a failure occurs. On the other hand, high-availability clusters have to initiate a new service on a backup computer system and then recreate all of the network-connections to the clients in order to provide continued service when a failure occurs. Note that the failover mechanism within high-availability clusters is not transparent externally and can take a few minutes to complete a failover operation. In contrast, process migration can provide seamless service migration and short recovery time.

Some system failures are predictable, so critical tasks can be migrated to a healthy computer system in standby prior to or when a failure occurs. Hence, one embodiment of the present invention migrates a process prior to the occurrence of a predictable system failure. However, some system failures are unpredictable. Thus, one embodiment of the present invention generates checkpoints for processes periodically so that the processes can be resumed from their most-recently generated checkpoints.

Figure 1A:
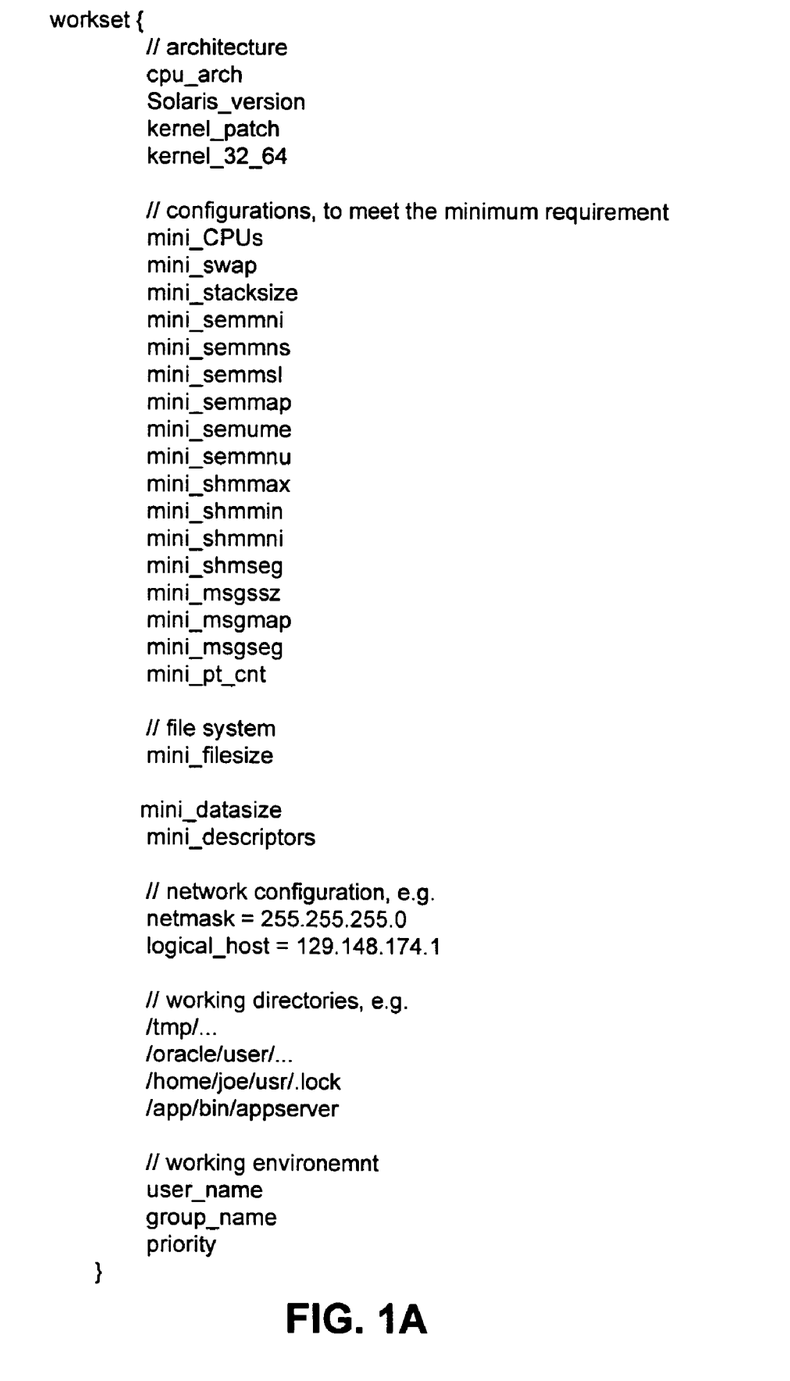
FIG. 1A presents an exemplary workset in accordance with an embodiment of the present invention.

In one embodiment of the present invention, the source computer system and the target computer system share the same: CPU architecture; operating system (OS) version and kernel patch; version of dynamically linked libraries; and device-name mapping. Furthermore, both computer systems satisfy the workset requirements for the process to be moved. FIG. 1A presents an exemplary workset in accordance with an embodiment of the present invention. Note that this workset is for the Sun™ Solaris™ OS.

In one embodiment of the present invention, process migration can be used to move processes to a computer system with more CPU resources than available on a computer system currently executing the process. For example, a scientific application executing on a computer system having only one CPU can be moved to a computer system having multiple CPUs without the need to restart the computation from the beginning.

In one embodiment of the present invention, the following states are encapsulated and are resumed: the inter-process-communication (IPC) state; the opened files state; the network state for connected service; the kernel state for the process, if both the source and the target machines are running the same version of the operating system with the same kernel patch. Note that two text segments for a process are always identical on any of two systems if they use the same version of the user application and if they use the same version of a shared library.

Before continuing with the discussion of this process, it is instructive to define several terms. "Local processes" are processes that only need to run on the local system. Examples include rpcbind, vold, sac, etc. "Global processes" are processes that need to be scheduled across different computer systems within a network. Examples include database servers, email servers, etc. A "global process ID" is a process ID that can be referred to on any computer system within the network (e.g., it can be defined as Machinename.Domainname.pid). A "process context" includes a thread stack, text, data, a heap, and mapped files. A "process kernel state" includes a process structure (proc), a user-structure (u), a spawned threads structure (thread), an address-space (as), light-weight-processes structure (lwp), an inter-process-communication (IPC) configuration, open file table entries, and network-connections. A "thread-migration queue" is a queue for threads which are ready to migrate from one computer system to another computer system. A "process-migration" queue is a queue for processes which are ready to migrate from one computer system to another computer system. Note that once all the threads of a process are in the thread-migration queue, the process is put in the process-migration queue. A "process checkpoint" is an encapsulation of a set of states gathered from the kernel data structure for the process so that a process can be restarted without breaking its execution after restoring its encapsulated state.

Checkpointing a Process

There are a number of techniques for generating a checkpoint for a user process. However, it is desirable for such a technique to meet the following criteria:

(1) it must be efficient so that any user process can be checkpointed at any time;
(2) it should minimize the volume of data to be transferred so that the overhead and the network traffic is minimized; and
(3) it should be easy to implement on an existing system.

In one embodiment of the present invention, both the kernel state and the user context are transferred from the source computer system to the target computer system. In this embodiment, the key challenge is generating a checkpoint for the kernel state.

In one embodiment of the present invention, executing a process involves executing threads that make up the process. The execution mode for the process is changed to kernel mode only if a system call is invoked. Once in kernel mode, kernel threads have to synchronize with each other on system-wide resource. Note that it is not possible to save the kernel state for a thread without breaking its execution when this type of synchronization is involved. Also, note that all system calls fall into two categories: (1) synchronous and (2) asynchronous. A synchronous system call waits until the system call is finished before returning control to the thread that made the system call. Hence, when a thread returns from a synchronous system call, there is no state left in the kernel. An asynchronous system call does not wait until the system call is finished before returning control to the thread that made the system call. Hence, a state might remain in the kernel until the system call is actually finished. In a typical OS, most asynchronous activities are I/O-related. For example, a write system call can return before the data is actually written to the disk.

In order to handle asynchronous system calls, one embodiment of the present invention uses an asynchronous system call counter in the thread structure. This counter is incremented by 1 whenever an asynchronous system call is invoked, and is decremented by 1 after the asynchronous system call completes (e.g., data is returned). If the counter is zero, it implies that it is safe to generate a checkpoint for the process. Hence, it is safe to generate a checkpoint for a process when all of its threads are in user mode and when all of the asynchronous system call counters are zero.

There are scenarios when one thread for a process returns from kernel mode and causes at least one of the other threads for the process to go into kernel mode. In this scenario, there is always one thread in kernel mode throughout the life cycle of the process. For example, consider the following scenario. Threads T1, T2, T3 need to be checkpointed, and T1, T2, T3 are cooperating closely via semaphores S1, S2, S3. T1 releases S1 and tries to obtain S2. T2 releases S2 and tries to obtain S3. T3 releases S3 and tries to obtain S1. If this loop occurs throughout the life cycle of the process, a deadlock can arise when an attempt is made to generate a checkpoint for T1, T2, or T3.

Figure 1B:
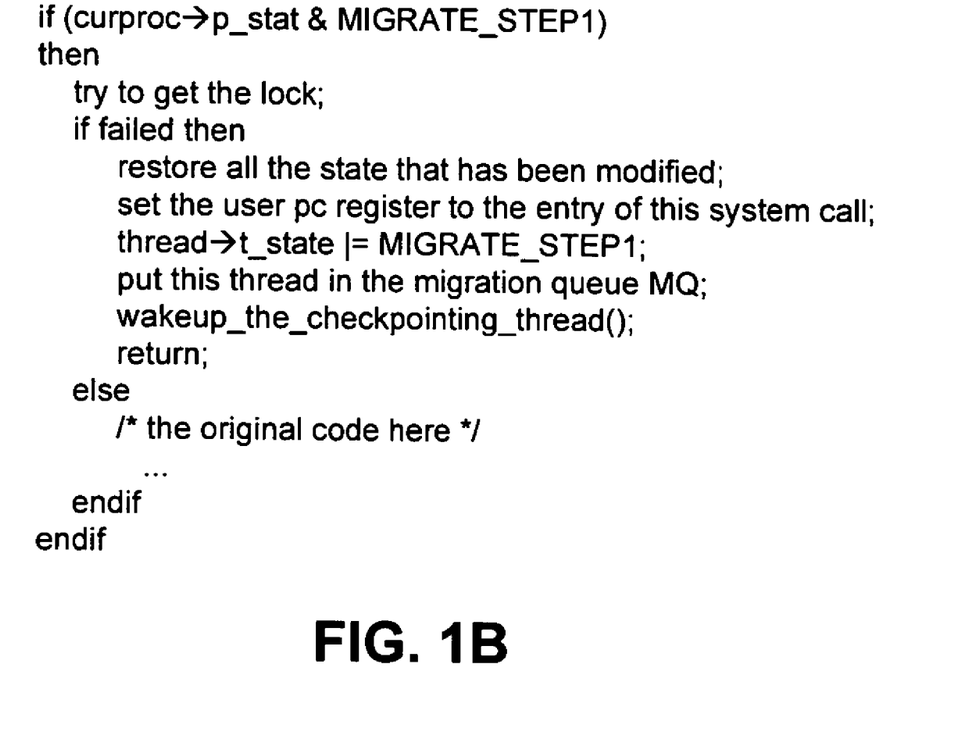
FIG. 1B presents pseudocode which handles the deadlock problem when generating a checkpoint for a thread in accordance with an embodiment of the present invention.

One solution for this problem is to generate a checkpoint for a thread when it returns from a system call. However, a more-general solution exists. In one embodiment of the present invention, for each system call that can cause a deadlock, the logic presented in FIG. 1B is inserted at each point of the checkpointing mechanism that can potentially block a thread. The purpose of the code in FIG. 1B is to avoid blocking a thread when an attempt is made to generate a checkpoint for the thread. If a thread has to be blocked during a system call, the state of the thread prior to the point when the context was switched to kernel mode is restored. The user PC (program counter) register is reset so that it points to the instruction at the entry of this system call so that this system call can be re-executed once the process is migrated to the target computer system.

Figure 1C:
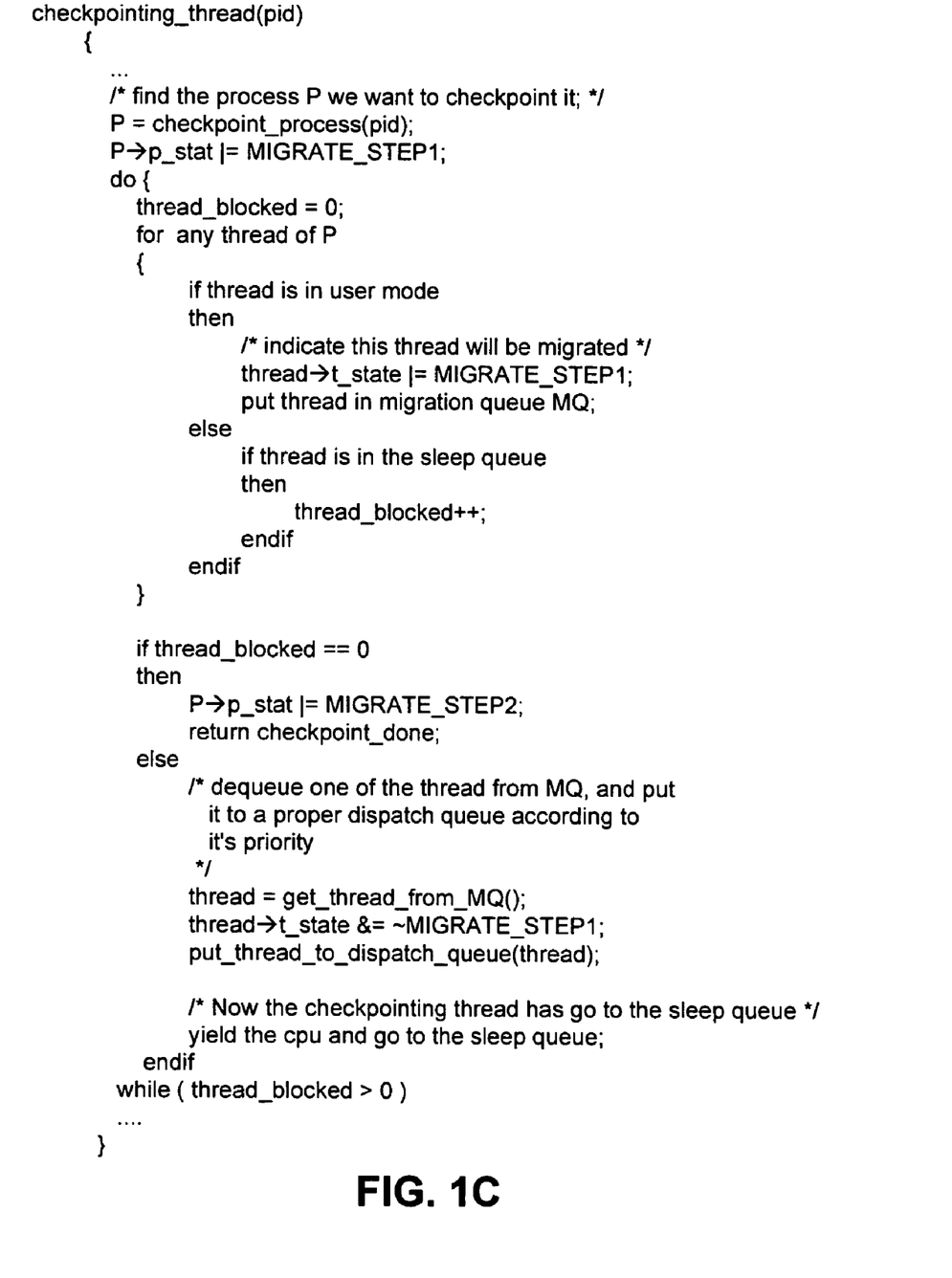
FIG. 1C present pseudocode for a dedicated thread that is used to generate a checkpoint for a live process in accordance with an embodiment of the present invention.

In one embodiment of the present invention, a dedicated thread is used to generate a checkpoint for a live process. FIG. 1C present pseudocode for a dedicated thread that is used to generate a checkpoint for a live process in accordance with an embodiment of the present invention. The code presented in FIG. 1C can generate a checkpoint for all types of living processes. If all of the threads are in user mode, the overhead for generating a checkpoint can be ignored. If some threads are blocked (i.e. a system call), the system can serialize the execution of the process. Hence, the complexity of this code depends on the number of threads a process has and the average time slice a CPU executes a given thread before the thread is kicked out of the CPU.

Figure 2:
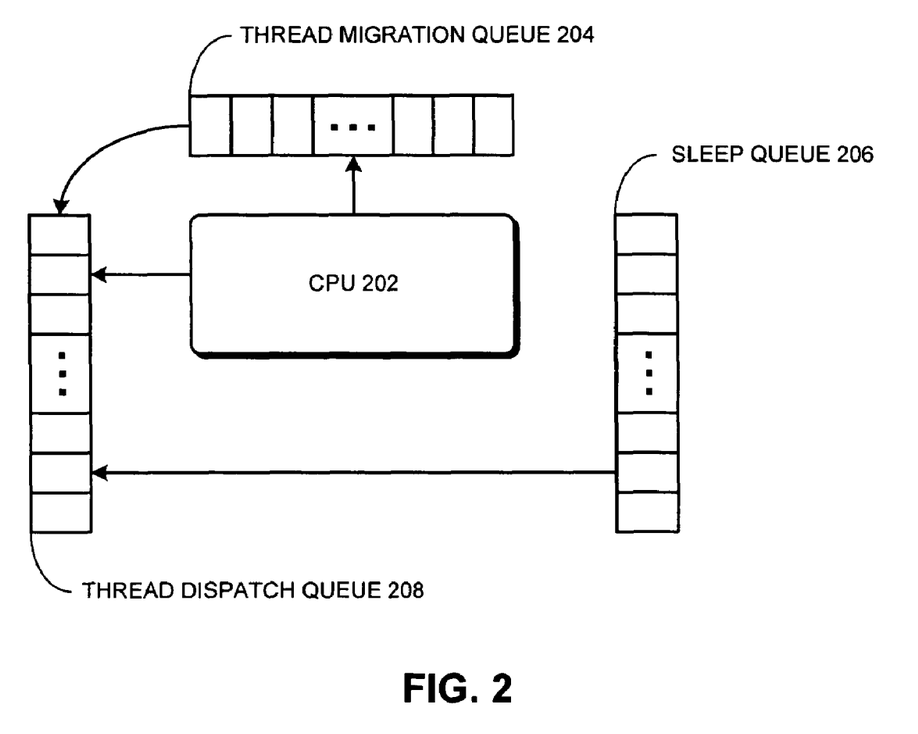
FIG. 2 presents a block diagram of a central processing unit (CPU) and various queues used to migrate a process from a source computer system to a target computer system in accordance with an embodiment of the present invention.

FIG. 2 presents a block diagram of CPU 202 and various queues used to migrate a process from a source computer system to a target computer system in accordance with an embodiment of the present invention. If sleep queue 206 is not empty, threads in thread-migration queue 204 are placed into thread dispatch queue 208. When a thread is woken up from sleep queue 206, it is placed into thread dispatch queue 208. Threads are preempted when they return from a system call or are checkpointed (by being placed into thread-migration queue 204) before the system call.

Architecture

One embodiment of the present invention extends the process scheduling mechanism from a single computer system to support multiple computer systems coupled together by a network. A global process ID is used so that a global process can be traced wherever it goes. In one embodiment of the present invention, the global process ID is defined as:

DomainName.MachineName.pid

In one embodiment of the present invention, a global process-migration (GPM) daemon, a master GPM daemon, and a replica GPM daemon are used to schedule and migrate a process from a source computer system to a target computer system.

A GPM daemon is run on computer system that can potentially be the home of a global process. A GPM watches the local resources for a given computer system. It creates a bridge (via the master GPM) between the given computer system and the target computer system which a global process is to be migrated to if necessary. If a GPM is running on a target machine related to a migration, the GPM on the target machine spawns a process, and this process eventually initializes itself into a skeleton process of the process being migrated.

A master GPM is a GPM daemon which handles the process-migration requests from any of the GPMs, and is responsible for selecting the right target computer system to which a global process is migrated. Furthermore, a master GPM is also a GPM serving its local machine.

A replica GPM is a backup of the master GPM. The replica GPM keeps all of the updated global process information that the master GPM maintains. In one embodiment of the present invention, more than one replica GPM exists in a given domain. One of the replica GPMs becomes the master GPM when the master GPM is out of reach or has failed. The new master GPM then chooses a GPM to be its replica GPM if necessary. A replica GPM is also a GPM which can serve its own machine.

Figure 3:
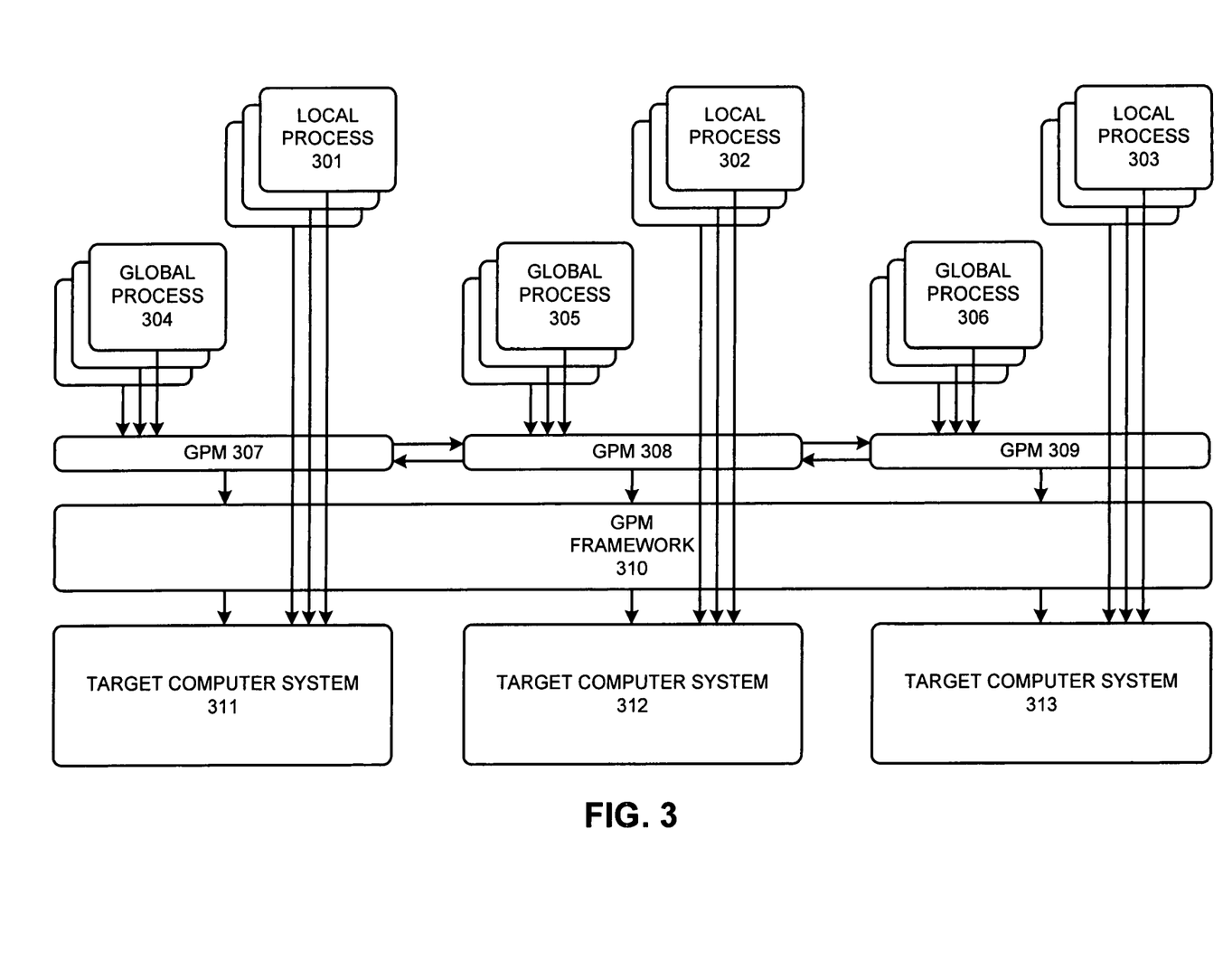
FIG. 3 presents a block diagram of the process-migration framework architecture in accordance with an embodiment of the present invention.

FIG. 3 presents a block diagram of the process-migration framework architecture in accordance with an embodiment of the present invention. Global processes 304-306 are managed by global process-migration (GPM) services 307-309, respectively. GPMs 307-309 are coupled to target computer system 311-313 through GPM framework 310. Local processes 301-303 execute on target computer systems 311-313, respectively.

In one embodiment of the present invention, the operating system swap mechanism is extended so that processes running on a source computer system can be swapped out from the source computer system and can be swapped back into the target computer system after the kernel state for the process is resumed. By taking advantage of the swap mechanism, the following benefits are achieved:

(1) reduced migration time, especially during process resumption;
(2) reduced disk/memory usage for the process-migration;
(3) reduced network traffic needed for transferring a set of process states; and
(4) a simplified process-migration architecture.

In one embodiment of the present invention, the process is swapped out to a shared storage device, which is accessible by the target computer system, so that the target computer system can access it and swap in the process. The target computer system should ideally be able to swap in a process from a shared device. Note that when a checkpoint is "swapping" out or in, the encapsulated kernel state for the process passes through a fast data channel like WCI, SCI, etc. In one embodiment of the present invention, a checkpoint is "swapped out" to a storage device so that another computer system can resume executing the process at a later time.

Figure 4:
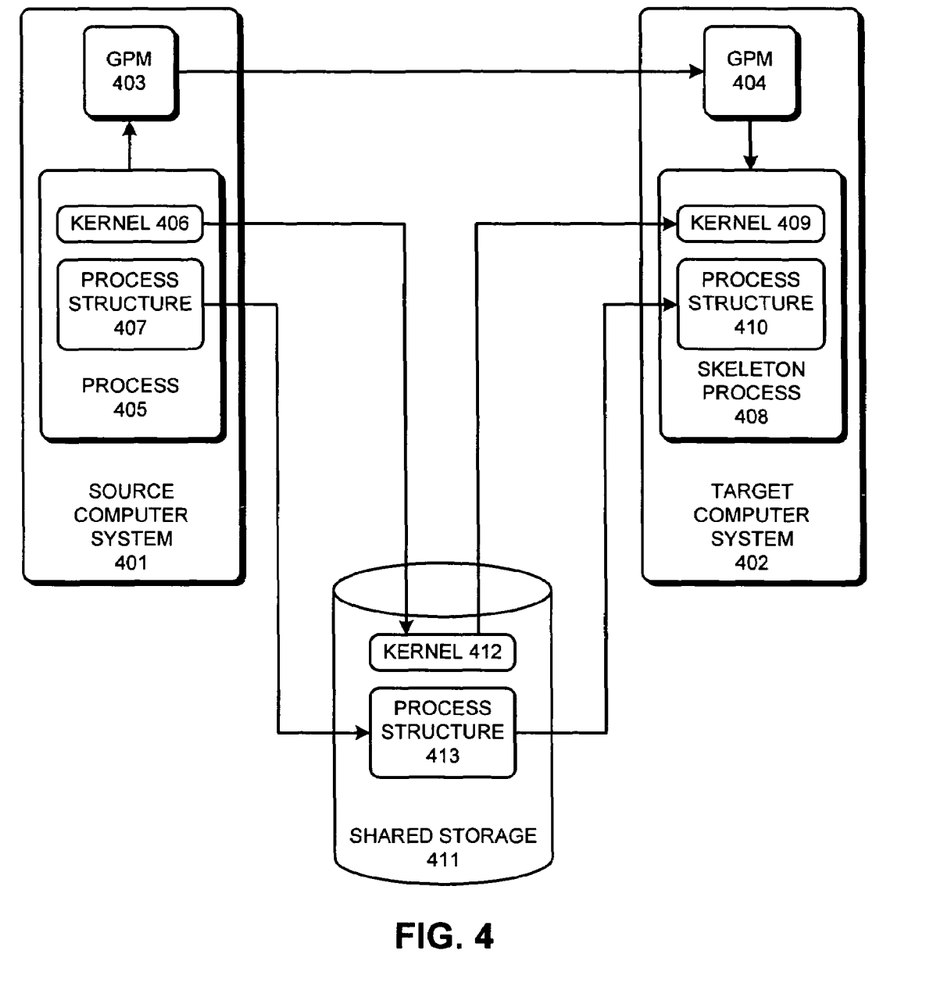
FIG. 4 presents a block diagram of a swap procedure in accordance with an embodiment of the present invention.

FIG. 4 presents a block diagram of a swap process in accordance with an embodiment of the present invention. During this process, GPM 403 and process 405 execute on source computer system 401. Note that, process 405 includes kernel state 406 and process structure 407. When process 405 is ready to be migrated to computer system 402, GPM 404 spawns skeleton process 408. Note that skeleton process. 408 includes kernel state 409 and process structure 410. Kernel state 406 and process structure 407 are then swapped out to shared storage device 411 and stored as kernel state 412 and process structure 413, respectively. Next, skeleton process 408 loads kernel state 412 and process structure 413 from shared storage device into kernel state 409 and process structure 410, respectively. Skeleton process 408 then resumes execution of the process.

Migrating a Process

In one embodiment of the present invention, three migration status indicators are used for threads and processes to indicate the current status of migration for the process. MIGRATE_STEP1 indicates that the system will start checkpointing a process. MIGRATE_STEP2 indicates that the checkpoint of a process has been completed, but the file system still needs to be synchronized to keep the file system updated. MIGRATE_STEP3 indicates that the process is safe to be moved.

In one embodiment of the present invention, a process is spawned by a GPM which is then initialized to become a "skeleton process" with system calls such as open( ), dup( ), fcntl( ), socket( ), bind( ), listen( ), shmget( ), msgop( ), etc. The skeleton process has the same kernel criteria (i.e. the same opened files, the same network-connections, the same IPC state, etc) as the process to be migrated.

In one embodiment of the present invention, a new system call, kexec( ), is used to resume the kernel state on a target computer system with the data gathered from the source computer system. This system call is executed by the skeleton process.

Figure 5A:
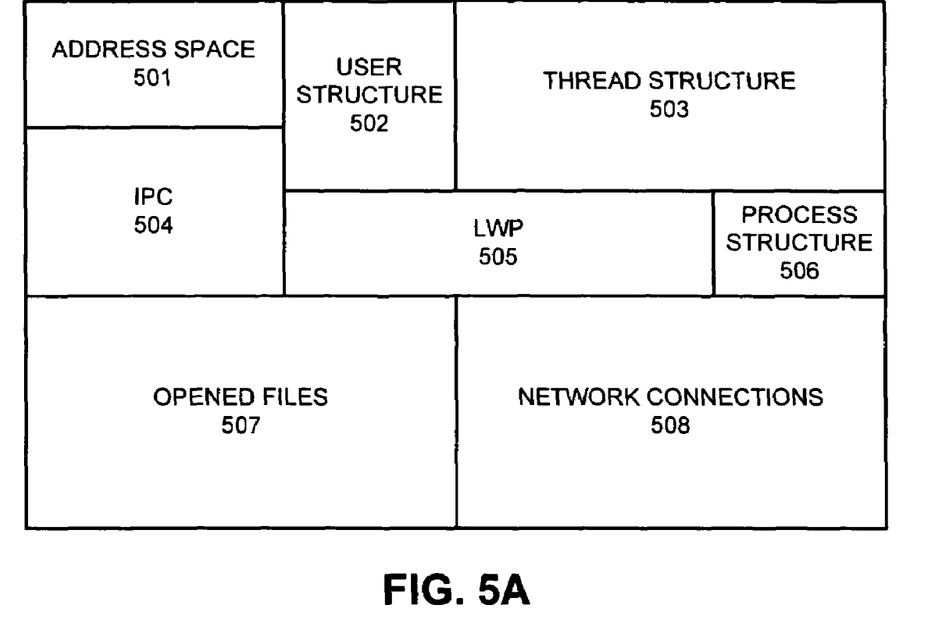
FIG. 5A presents a block diagram illustrating the kernel state for a process on a source computer system prior to migrating the process to a target computer system in accordance with an embodiment of the present invention.

FIG. 5A presents a block diagram illustrating the kernel state for a process on a source computer system prior to migrating the process to a target computer system in accordance with an embodiment of the present invention. The kernel state for the process include address-space 501, user-structure 502, thread structure 503, IPC 504, LWP 505, process structure 506, opened files 507, and network-connections 508.

Figure 5B:
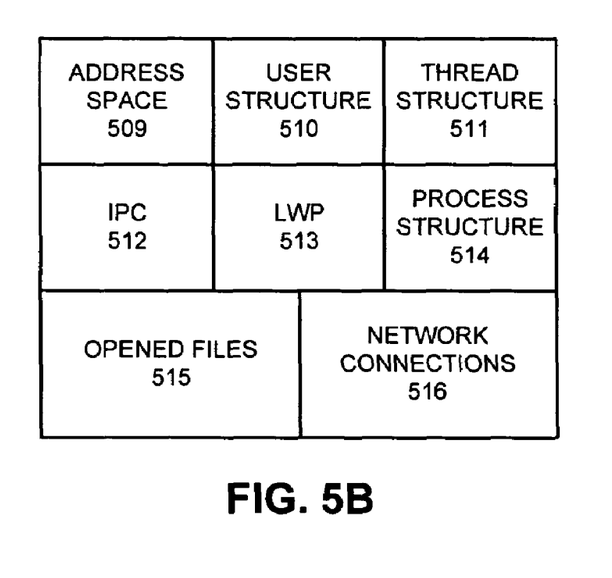
FIG. 5B presents a block diagram illustrating a spawned process on the target computer system used to resume execution of the process on the target computer system in accordance with an embodiment of the present invention.

FIG. 5B presents a block diagram illustrating a spawned process on the target computer system which is used to resume execution of the process on the target computer system in accordance with an embodiment of the present invention. To resume execution, the GPM on the target computer system spawns a process which is initialized to become a skeleton process. This skeleton process is initialized using specific kernel criteria, such as the number of threads to be spawned, the number of files to be opened, the number of network-connections to be established, etc. At this point, address-space 509, user-structure 510, thread structure 511, IPC 512, LWP 513, process structure 514, opened files 515, and network-connections 516 only contain the initial state of the skeleton process.

Figure 5C:
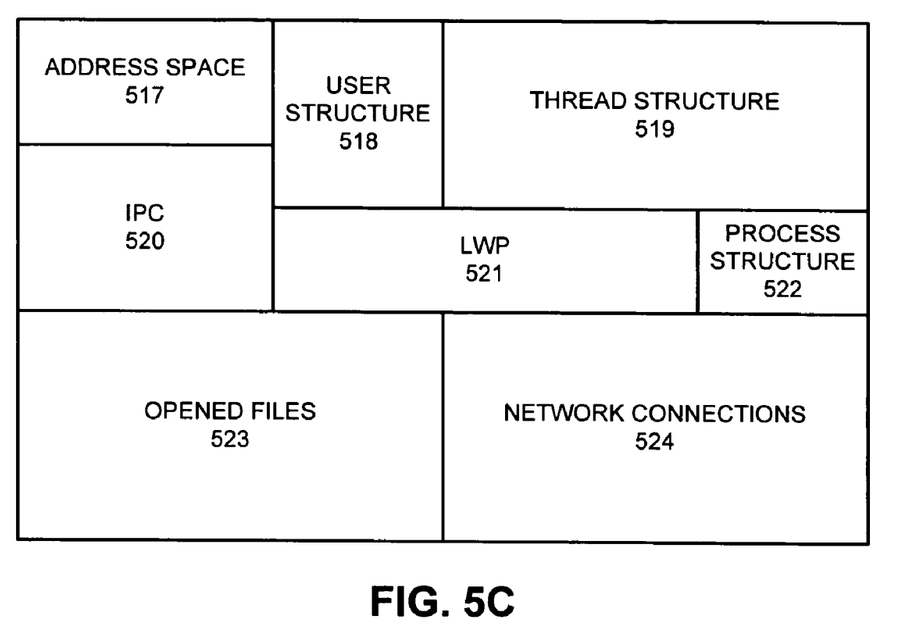
FIG. 5C presents a block diagram illustrating a skeleton process loaded with the kernel state from the source computer system in accordance with an embodiment of the present invention.

FIG. 5C presents a block diagram illustrating a skeleton process loaded with the kernel state from the source computer system in accordance with an embodiment of the present invention. Address-space 517, user-structure 518, thread structure 519, IPC 520, LWP 521, process structure 522, opened files 523, and network-connections 524 contain the kernel state from the source computer system.

Figure 6:
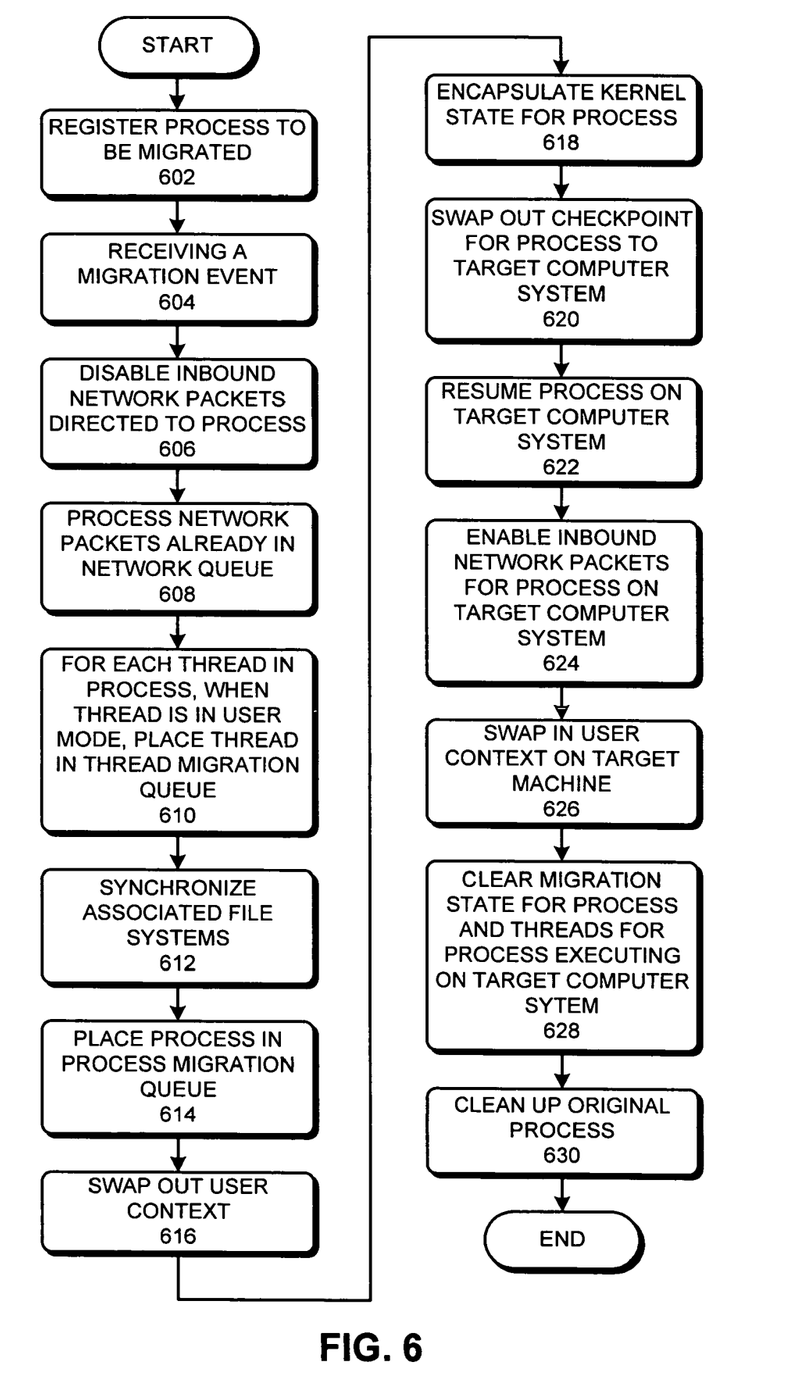
FIG. 6 presents a flow chart illustrating the process of migrating a process in accordance with an embodiment of the present invention.

FIG. 6 presents a flow chart illustrating the process of migrating a process in accordance with an embodiment of the present invention. The process begins when the system registers a process P, which is to be migrated, with the global process scheduling framework (step 602). In one embodiment of the present invention, process P is a global process.

Next the system receives a migration event (step 604). In one embodiment of the present invention, the migration event can include: (1) a request by an authorized user to migrate the process to another computer system; (2) a system failure event; (3) an online load balance event; or (4) an online system maintenance event.

The system then disables inbound network packets directed to process P (step 606). This step only affects process P. Outbound packet transmission is still enabled for the process to ensure that any pending outgoing packets in the network queue are transmitted. Note that the network queue is flushed when the socket is closed (i.e. right before the migration).

Next, the system processes network packets already in the network queue (step 608). The system then generates a checkpoint for process P. For each thread in the process, when the thread is in a user mode, the system places the thread into a thread-migration queue (step 610). When a thread is in user mode, the system sets the state of a thread to MIGRATE_STEP1, and places it into the thread migrate queue. When all the threads are in state MIGRATE_STEP1, the system changes the process state to MIGRATE_STEP2.

Next, the system synchronizes associated file systems (step 612). In one embodiment of the present invention, synchronizing the file system involves: (1) finishing all the relevant pending I/O operations and (2) writing back all of the cached data to the relevant file systems. The system then changes the state of process P to MIGRATE_STEP3 and places it in the process-migration queue (step 614). At this point, process P is ready to move.

Next, the system swaps out the whole user context to a storage device (step 616). In one embodiment of the present invention, the storage device is a shared storage device accessible by the source computer system and the target computer system.

The system then encapsulates the kernel state for the process (step 1018). Note that not all of the data in the kernel data structure is useful (i.e. most of the fields will be assigned new values when the checkpoint is resumed on the target computer system). The kernel state for the process includes the state of: a process structure (proc), a user structure (u), an address space (as), a spawned threads structure (thread), a light-weight-processes structure (lwp), an inter-process-communication (IPC) configuration, open file table entries, and network-connections. The IPC state includes: pending signal, msg, semaphore, and shared memory states. Note that msg gathers the message queue state information and the pending messages. Also, note that the data in the message queue can be very large. Since it is not practical to wait until the message in the message queue is gone, the message block is be migrated as well.

Note that for network-connections, a socket state is maintained through the following: sonode. (associates a opened socket), vnode (associates a network device), an opened stream related to this socket (i.e. all the state that has been set with strsetopt( )—these states are located in each stream module in the stream referred by the vnode, hence, these states must be saved and restore seamlessly on the target computer system.

Next the system "swaps out" the checkpoint for the process checkpoint (i.e. the kernel state gathered at step 618) to a target computer system through a fast data channel (step 620). In one embodiment of the present invention, the system first swaps out the checkpoint to a shared storage device and resumed at a later time on a target machine.

The system then resumes the process on the target computer system as soon as the checkpoint is received at the target computer system (step 622). The GPM running on this target computer system spawns a process, and this process is initialized into a skeleton process with the kernel criteria extracted from the checkpoint. The skeleton process then calls kexec( ) to resume the process kernel state with the checkpoint data. This system call involves assigning states/values to the appropriate fields in the relevant kernel data structures, such as proc, thread, u, lwp, as, vnode, sonode, rnode, pnode, opened file structures, sending control protocols down the streams to restore the network-connections, etc. Note that kexec( ) also puts the process and its threads into the appropriate queues according to their priority and state.

Next, the system enables inbound network packets for the process on the target computer system (step 624) and the system swaps in the user context (step 626). The system then clears all of the migration states for the process and its threads on the target computer system (step 628). During this period, the system might have to experience many page faults while executing the resumed process.

When the process has been resumed on the target computer system, the system cleans up the original process on the source computer system (step 630). Note that the global ID is kept active so that it can be traced in the future. Also note that when the network-connections are cleaned, the network should not generate any packets indicating a disconnection to the client.

Performance

Performance can be analyzed with respect to the migration phases described above. From step 606 to step 614, the performance cost involves only very limited I/O activities and thread-scheduling latency. At step 616, the total cost of swapping out a whole user context depends on the amount of modified in-memory pages, and the I/O bandwidth of the storage device used. This time can be minimized by periodically writing back modified pages to the disk so that during process migration, the number of modified pages which need to be written back to disk is reduced. At step 618, a copy of the relevant kernel state of the process only needs to be made. Since all of the threads are in the migration queue, this data will not be locked by another process, hence, the cost for this step can also be ignored.

The cost for step 620 is determined by the throughput of the storage device used and by the amount of data to be transferred. The volume of the kernel state is mainly decided by the amount of pending messages in the message queue, the number of opened files, the number of networking connections, and the number of threads for the process. The overhead of transferring data can be reduced by using fast data channels such as WCI and SCI.

At step 622, the cost for resuming the kernel state is determined by the number of threads, the number of opened files, number of network-connections, and the number of messages in the message queue. This step costs a slightly more than the creation of the skeleton process.

The cost for step 624 and 626 can be ignored. The cost for step 628 can also be ignored because this will only happen on the source machine after the migration.

Hence, the total overhead is decided by step 616-622. Among them, step 616 can be the largest factor. Fortunately, the cost of step 616 can be overlapped with the cost of steps. 618-622. This is because the user context is swaped in only after the kernel state is resumed. Let cost(x) be the cost of step x, then the total cost of migrating a process is approximately:

max(cost(step 616), cost(step 618)+cost(step 620)+ cost(step 622)).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for migrating a process from a source computer system to a target computer system, comprising:
    generating a checkpoint for the process on the source computer system, wherein the checkpoint includes a kernel state for the process;
    swapping out dirty pages of a user context for the process to a storage device which is accessible by both the source computer system and the target computer system;
    transferring the checkpoint to the target computer system;
    loading the kernel state contained in the checkpoint into a skeleton process on the target computer system;
    swapping in portions of the user context for the process from the storage device to the target computer system; and
    resuming execution of the process on the target computer system.

2. The method of claim 1, wherein generating the checkpoint for the process on the source computer system involves:
    for each thread in the process,
        determining if the thread is in a user mode; and
        if so, placing the thread into a thread-migration queue; and
    after all threads for the process are in the thread-migration queue, synchronizing associated file systems; and
    after the associated file systems have been synchronized, placing the process into a process-migration queue.

3. The method of claim 2, wherein synchronizing associated file systems involves:
    completing pending I/O operations; and
    writing back cached data to associated file systems.

4. The method of claim 2, wherein the kernel state for the process can include:
    a process structure state;
    a user-structure state;
    an address-space state;
    a spawned threads structure state;
    a light-weight-processes structure state;
    an inter-process-communication state;
    a list of opened files state; and
    a network-connections state.

5. The method of claim 1, wherein generating the checkpoint for the process on the source computer system involves encapsulating the kernel state for the process.

6. The method of claim 1, wherein prior to swapping in portions of the user context for the process from the storage device to the target computer system, the method further comprises enabling inbound packets to the process on the target computer system.

7. The method of claim 1, wherein prior to loading the kernel state contained in the checkpoint into the skeleton process on the target computer system, the method further comprises spawning the skeleton process, which involves considering information on the number of threads to be spawned for the process, the number of files to be opened for the process, and the number of network-connections to be established for the process.

8. The method of claim 1, wherein transferring the checkpoint to the target computer system involves:
    first transferring the checkpoint to an intermediate storage device; and
    at a later time, transferring the checkpoint from the intermediate storage device to the target computer system.

9. The method of claim 1, wherein prior to generating the checkpoint for the process on the source computer system, the method further comprises:
    registering the process with a global process scheduling framework;
    receiving an indication that the process is to be migrated, wherein the indication can include a request by an authorized user, a system failure event, an online load-balancing event, or online system maintenance event;
    disabling inbound network packets directed to the process; and
    processing network packets already in a network queue for the source computer system.

10. A computer-readable storage medium storing instructions that when executed by a computer cause the computer to perform a method for migrating a process from a source computer system to a target computer system, wherein the method comprises:
    generating a checkpoint for the process on the source computer system, wherein the checkpoint includes a kernel state for the process;
    swapping out dirty pages of a user context for the process to a storage device which is accessible by both the source computer system and the target computer system;
    transferring the checkpoint to the target computer system;
    loading the kernel state contained in the checkpoint into a skeleton process on the target computer system;
    swapping in portions of the user context for the process from the storage device to the target computer system; and
    resuming execution of the process on the target computer system.

11. The computer-readable storage medium of claim 10, wherein generating the checkpoint for the process on the source computer system involves:
    for each thread in the process,
        determining if the thread is in a user mode; and
        if so, placing the thread into a thread-migration queue; and
    after all threads for the process are in the thread-migration queue, synchronizing associated file systems; and
    after the associated file systems have been synchronized, placing the process into a process-migration queue.

12. The computer-readable storage medium of claim 11, wherein synchronizing associated file systems involves:
    completing pending I/O operations; and
    writing back cached data to associated file systems.

13. The computer-readable storage medium of claim 11, wherein the kernel state for the process can include:
a process structure state;
a user-structure state;
an address-space state;
a spawned threads structure state;
a light-weight-processes structure state;
an inter-process-communication state;
a list of opened files state; and
a network-connections state.

14. The computer-readable storage medium of claim 10, wherein generating the checkpoint for the process on the source computer system involves encapsulating the kernel state for the process.

15. The computer-readable storage medium of claim 10, wherein prior to swapping in portions of the user context for the process from the storage device to the target computer system, wherein the method further comprises enabling inbound packets to the process on the target computer system.

16. The computer-readable storage medium of claim 10, wherein prior to loading the kernel state contained in the checkpoint into the skeleton process on the target computer system, wherein the method further comprises spawning the skeleton process, which involves considering information on the number of threads to be spawned for the process, the number of files to be opened for the process, and the number of network-connections to be established for the process.

17. The computer-readable storage medium of claim 10, wherein transferring the checkpoint to the target computer system involves:
first transferring the checkpoint to an intermediate storage device; and
at a later time, transferring the checkpoint from the intermediate storage device to the target computer system.

18. The computer-readable storage medium of claim 10, wherein prior to generating the checkpoint for the process on the source computer system, wherein the method further comprises:
registering the process with a global process scheduling framework;
receiving an indication that the process is to be migrated, wherein the indication can include a request by an authorized user, a system failure event, an online load-balancing event, or online system maintenance event;
disabling inbound network packets directed to the process; and
processing network packets already in a network queue for the source computer system.

19. An apparatus that migrates a process from a source computer system to a target computer system, comprising:
a process-migration mechanism on the source computer system configured to:
generate a checkpoint for the process on the source computer system, wherein the checkpoint includes a kernel state for the process;
swap out dirty pages of a user context for the process to a storage device which is accessible by both the source computer system and the target computer system; and to
transfer the checkpoint to the target computer system; and
a process-resume mechanism on the target computer system configured to:
load the kernel state contained in the checkpoint into a skeleton process on the target computer system;
swap in portions of the user context for the process from the storage device to the target computer system; and to
resume execution of the process on the target computer system.

20. The apparatus of claim 19, wherein while generating the checkpoint for the process on the source computer system, the process-migration mechanism is configured to:
for each thread in the process,
determine if the thread is in a user mode; and
if so, to place the thread into a thread-migration queue; and
after all threads for the process are in the thread-migration queue, to synchronize associated file systems; and
after the associated file systems have been synchronized, to place the process into a process-migration queue.

* * * * *